United States Patent [19]

Grimsley

[11] 4,238,335

[45] Dec. 9, 1980

[54] UNDERSEA SAND FILTER FOR CLEANING INJECTION WATER

[75] Inventor: R. Leroy Grimsley, Ponca City, Okla.

[73] Assignee: Conoco, Inc., Ponca City, Okla.

[21] Appl. No.: 19,385

[22] Filed: Mar. 12, 1979

[51] Int. Cl.³ ............................................. B01D 23/24
[52] U.S. Cl. .................................. 210/802; 210/278
[58] Field of Search ................ 166/51, 228, 268–275, 166/335, 362; 210/80, 81, 170, 189, 268, 269, 275, 277, 278, 285, 424, 425, 427

[56] References Cited

U.S. PATENT DOCUMENTS

| 2,024,646 | 12/1935 | Jones | 210/288 |
| 2,448,157 | 8/1948 | Schneider | 210/241 |
| 3,598,235 | 8/1971 | Demeter | 210/275 |
| 3,667,604 | 6/1972 | Lagoutte | 210/189 |
| 3,722,686 | 3/1973 | Arnett et al. | 210/242 R |
| 4,051,901 | 10/1977 | Sarem et al. | 166/270 |

Primary Examiner—Ivars C. Cintins
Attorney, Agent, or Firm—Cortlan R. Schupbach, Jr.

[57] ABSTRACT

A submarine sand filter is employed to filter water for uses requiring lack of solid contaminants, such as oil reservoir injection. The filter is provided with backwash means and allows an efficient use of differential pressure heads.

5 Claims, 2 Drawing Figures

UNDERSEA SAND FILTER FOR CLEANING INJECTION WATER

This invention relates to a remote underwater filter. More particularly, this invention relates to an improved remote control underwater filter having backwash capability.

Filters have long been used for various purposes to remove solid contaminants from water. For example, the use of filters in swimming pools, water treatment, and oil well reservoir injections are all well known. However, many applications such as injection of solids-free water into oil well reservoirs requires tremendous amounts of water, thus filters must be kept substantially clean in order to provide a high quality substantially solids-free water in large amounts.

The filters are known as demonstrated by U.S. Pat. Nos. 2,448,157; 2,024,646; and 3,722,686. These references disclose underwater filter designs. The apparatus described in U.S. Pat. No. 2,024,646 also provides for backflushing.

However, for the large volumes of water needed, in offshore oil reservoirs together with a reduction of weight desired for offshore platforms, requires the use of an efficient filter with as small a weight as possible.

It is therefore an object of the instant invention to provide a submerged filter for cleaning water while reducing necessary weight and allowing remote control. Other objects will become apparent to those skilled in this art as the description proceeds.

It has now been discovered according to the instant invention that these objects are met by an apparatus for removing particulate solids from fluid when said apparatus is submerged in said fluid, comprising
(a) an inner chamber having an outer wall;
(b) an outer chamber surrounding said inner chamber and having an outer wall, the inner wall of said outer chamber being common with said outer wall of said inner chamber;
(c) means for retaining particulate filter media means in said outer chamber, said retaining means allowing fluid communication from said fluid through said retained particulate filter media means into said inner chamber; and
(d) means for recovering particulate free fluid from said inner chamber.

The extra cost to build offshore platforms to support the additional weight of water filters can cost millions of dollars. Some offshore oil fields require the injection of sea water. In most cases, the most economical and dependable method of cleaning sea water is filtration. Such filtration is commercially accomplished with sand filters, although other filter media such as charcoal, glass beads, walnut hulls and anthracite can be used. The biggest disadvantage of these and similar filters is the weight. When sand filters, for example, are placed under water, the weight problem can be eliminated or at least utilized at a better structural advantage.

The filter can, of course, be placed at any depth. However, in normal use, the filters will be placed at least deep enough to avoid the effects of surface wave and wind action. The pressure head is provided to the filter by positioning the outlet pump below the water. When the outlet pump is placed between 50 and 100 feet below the surface, head pressure is provided to the filter. Head pressure limitation is in the range of about 0.44 pounds per square inch per foot of water depth. Pump design limits the pressure to the filter in combination with the depth of the pump.

The invention is more concretely described with reference to the drawings wherein the instant invention is exemplified in a preferred embodiment.

Figure 1:
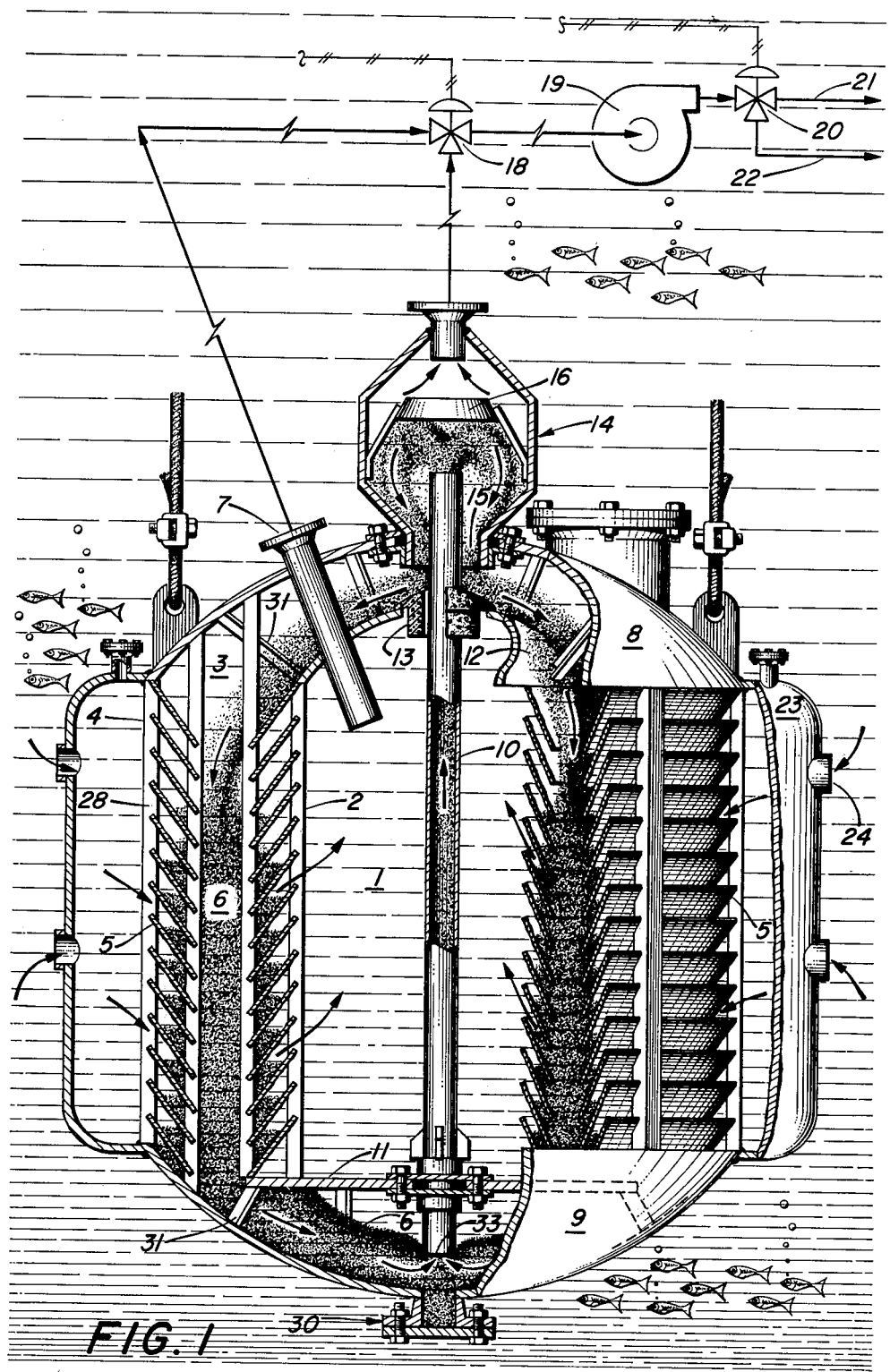
FIG. 1 shows the general structure of the underwater filters of the instant invention.

Specifically described, FIG. 1 is comprised of an inner chamber (1) having an outer wall (2); an outer chamber (3) surrounding said inner chamber and having an outer wall (4); the inner wall (2) of said outer chamber being common with said outer wall (2) of said inner chamber; retaining means (5) for retaining particulate filter media (6) in said outer chamber, said retaining means allowing fluid communication from fluid in which the filter is immersed through said retained filter media (6) which is in the outer chamber (3) into said inner chamber (1); and recovery means (7) for recovering particulate free fluid from said inner chamber.

Preferably, the retaining means (5) which comprises the inner and outer walls of the outer chamber are vertically aligned, frusto conical members set at opposing angles so as to retain the particulate filtering media (6). Likewise, it is preferred that the apparatus which comprises the inner and outer chambers have fluid impermeable partitions (8) at the upper end and lower end (9) of the apparatus. The fluid recovery means (7) will penetrate through either or both of these fluid impermeable means to the inner chamber for recovery of particulate free fluid.

In order to provide means for backwashing the apparatus to remove collected particles from the filter media, a cylindrical member (10) is axially aligned with said fluid impermeable end portions (8) and (9) of the inner and outer chambers, said cylindrical portion (10) penetrating the lower end of said inner fluid impermeable housing (11), and the upper fluid impermeable ends of both the inner (1) and outer (3) chambers. This cylindrical portion is then surrounded by a housing (14) affixed to an aperture (15) of the upper fluid impermeable end (8), said housing (14) containing a baffle (16) situated over the upper end of the cylindrical portion (10), the interior of the housing in fluid communication with outer chambers (3) at the lower end through an annulus, and in fluid communication with a switching valve (18) at the upper end. Fluid is passed through the apparatus by a pump (19) which passes recovered fluid to a valve (20). The valve (20) is capable of remote operation and is normally a three-way valve comprising a first means capable of directing filtered fluid to a desired source (21) and a second means capable of directing fluid containing particulate matter to a desired source (22). The first valve (18) also has two means, the first capable of passing particulate free water through the pump to a desired source, and the second of passing the contaminate laden backwash water through the pump to a disposal site.

In addition, the apparatus can be surrounded by a shield (23) having apertures therein (24) to allow the rapid passage of source water while preventing the entrance of marine organisms of significant size. In addition, the shield can optionally be fitted with injection means to inject chemicals into the water to assist filtration during operations. Representative examples of filtering aids which aid floccutation and filtration are polyacrylamides, polyamides, polyepichlorohydrine, and alum.

When in operation, valve (18) will be in a desired first means to allow the passage of contaminant free water through the valve to the pump (19) and then through the second valve in a desired first means to allow filtered liquid to the end use (21). The pump, acting through suction, draws fluid through the particulate filter media (6) passing first through the outer wall of the outer chamber (4) through the particulate media (6) contained in the outer chamber (3) and thence through the inner wall of the outer chamber (2) which comprises the outer wall of the inner chamber (1). The fluid so passing through the filter is sufficiently contaminant free for use and is withdrawn through the fluid recovery apparatus (7). If the filter media (6) becomes clogged or partially clogged by solid contaminants from surrounding fluid, valves (20) and (18) are changed to their alternate means of operation. Fluid continues to be drawn through the outer wall of the outer chamber but no longer has passage from the inner chamber. All suction is therefore applied through valve (18) and requires that fluid pass up the axially aligned cylindrical member (10) in order to exit the apparatus. In the constricted space of the cylindrical member (10), filter media (6) is withdrawn with the fluid in the form of a slurry. The slurry exits cylindrical member (10) and strikes baffle plate (16) which immediately disperses the particulate filter media, allowing the fluid to pass through valve (18) and pump (19) to disposal through line 22. Since the constricted axially aligned member (10) exits into a greatly enlarged chamber (14), the velocity of the filter media (6) is greatly lessened; then the particulate filter media (6) settles by gravity and returns to the outer chamber (3) where it is held in place by retaining means (5). This procedure is continued until all filter media has been flushed sufficiently to remove solid particulate contaminants which are sufficiently light in nature to be carried with fluid during backwash through valve (18) pump (19) valve (20) and out line (22) to disposal. Plug (13) is optionally provided to allow repair or replacement of axially aligned cylindrical member (10).

The apparatus contains supporting means (28) to maintain the filter media retaining means (5) in the desired position. These supporting means (28) are usually strong enough to support the weight of the apparatus when suspended. In addition, the apparatus can optionally be provided with a combination support and/or clean out trap (30). In addition, the apparatus is provided with various bracing means (31) to provide sufficient internal support while allowing fluid communication of the filter media (6) with the entrance (33) to the axially aligned cylinder (10) which passes through the inner chamber (1).

Figure 2:
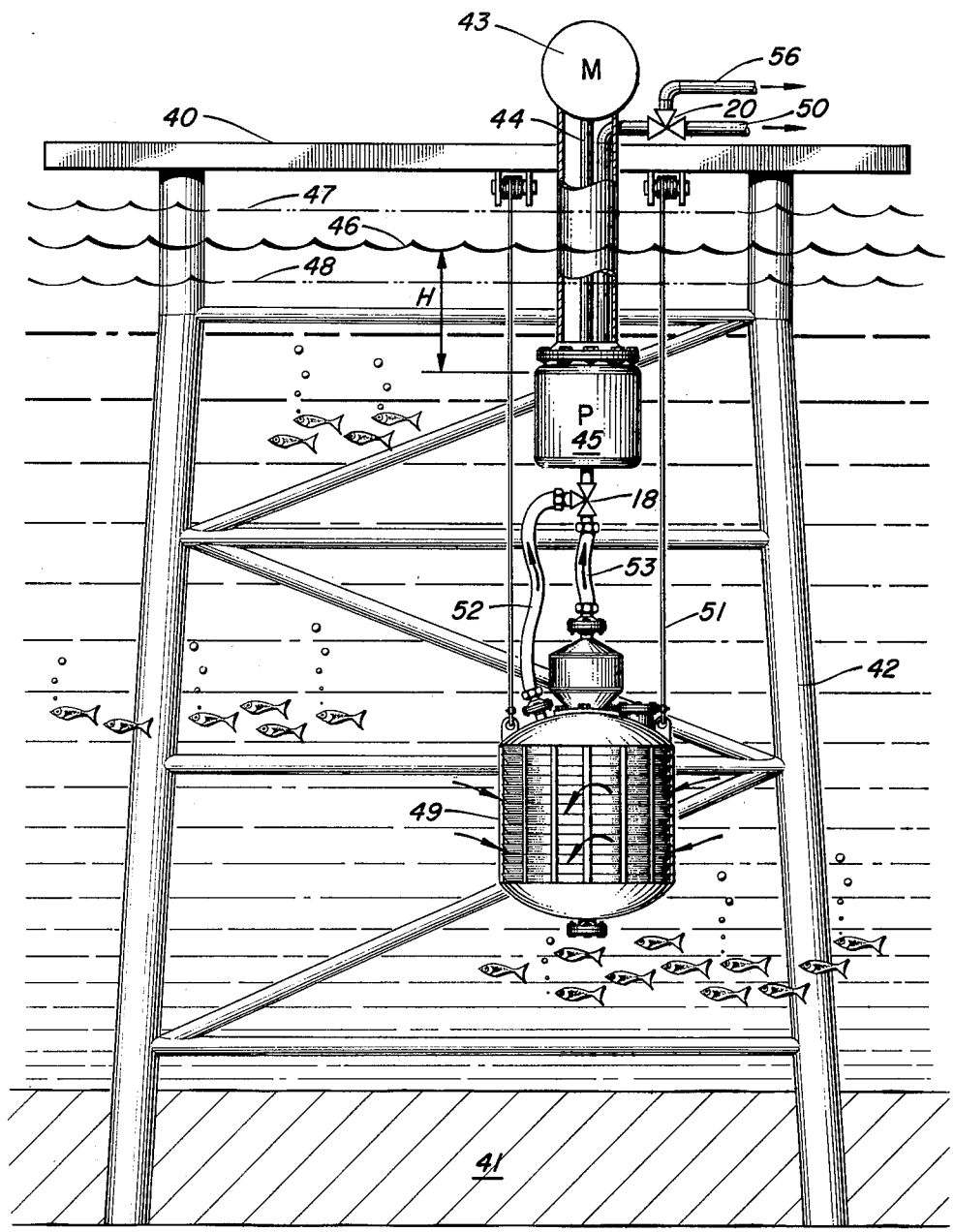
FIG. 2 shows the use of such filters on offshore platforms by using submerged pumps and filters to obtain the advantage of a pressure head differential.

FIG. 2 describes a use for the instant apparatus in an offshore platform. The figures schematically describes an offshore platform (40) which is connected to an ocean bed (41) by support legs (42). In addition to the normal platform operations, the platform provides a power source (43) which transmits power through a transmitting means (44) to a pump (45) which is suspended beneath the water level (46). The water level, especially in offshore environments, varies between high tide (47) and low tide (48). The pump is connected to a filter apparatus (49) of the instant invention and provides means (50) for water free of contaminants to be pumped to the platform (40) for use. The distance (H) is a theoretical head of water available for the pump.

The filter is connected to the platform by suspension means (51). The filter apparatus (49) is connected to a valve (18) by connecting means for both filters (52) and backwash (53) fluids. The connecting means are preferably flexible, such as hose, although other materials and/or rigid connecting means can be used. Fluid exiting the filter apparatus passes through valve (18) and pump (45) and is directed by valve (20), filtered fluid (50) going to desired use, and in the alternate means, backwash fluid containing solid particles going to disposal (56).

Thus the instant invention provides a filter design which has a self-cleaning function allows backwashing without loss of the filter media. In addition, the pump used for the filter will normally be submerged and placed on the vacuum end or clean fluid side of the filter. The fact that the pump is on the filter fluid side allows the depth at which the pump is submerged to effect the maximum pressure head available to the filter. The pressure required for the filtration mode is small, but higher pressure is needed to initiate slurry movement during filter backwash cycles. Such an effect is not noticed when the pump is on the force, or upstream side, of the filter where the pump can be equally in or out of the water without obtaining a benefit or detriment.

The advantages of the instant invention are quite clear. The filter is designed for normal underwater operations and particularly for offshore platforms, where weight is a problem. The design of the filter allows the weight problem to be lessened or eliminated entirely. The filter can be placed at any water depth, is of a simple design, and it is operable by remote control.

Thus it is clear that the submerged pump has an advantage over an above water pump in that the submerged filter application allow a pressure head to be provided to the filter by placing the pump on the outlet side of the filter beneath the surface of the fluid body. The pressure head of greater than 15 psi can be obtained in this manner. The maximum pressure head available to the filter is the distance (H) in FIG. 2. This theoretical head is about 0.44 psi per foot of water depth and allows applications not limited to the 15 psi air pressure that controls for vacuum applications on the surface.

Common sense dictates that the filter intake normally be located where suspended solids are at a minimum. In sea water of the best quality, the intake is usually found at an intermediate depth between the surface of the sea and the ocean bed. Water near the surface is usually high in suspended solids due to photosynthesis, while water near the bottom is usually high in organic and inorganic sediment.

When the filter pump is on the outlet side of the filter, better filtration will occur since the water is filtered before the very turbid conditions of the pump are encountered. Centrifugal pumps and high velocity pumps are examples of agitation that break up the fragile gelatinous matter in unfiltered seawater and allow it to recombine on the downstream side of the pump. Such an effect is avoided with the apparatus of the instant invention. In addition, any additive necessary to form a "flock" which can be more easily filtered can be inserted into the instant apparatus when the optional outer housing (23) is used.

Thus it is apparent that the instant invention provides an apparatus capable of reducing the weight in applications where extra weight is expensive and undesirable. The filter and pump can be submerged, although the filter itself can be anywhere upstream of the pump at any depth. In addition, the water pickup for the filter can be somewhere apart from the filter itself. When a housing is used, another separate water pickup can be utilized. These filters and pumps can be supported on the ocean bottom, from offshore platform legs, or dangled by chains or cables from the platform itself.

In many petroleum applications, nearly 200,000 gallons of water a day are necessary for injection uses. Thus it can be seen that the elimination of weight from the platform by placing the filter below the surface is greatly desirable.

In operation, the deeper the pump is placed, the more effective the pressure differential.

While certain embodiments and details have been shown for the purpose of illustrating this invention, it will be apparent to those skilled in this art that various changes and modifications may be made herein without departing from the spirit or scope of the invention.

I claim:

1. A method for filtering injection water prior to use in an offshore oil platform comprising filtering said water through an apparatus submerged in an ocean environment, said apparatus comprising
   (a) an inner chamber having an outer wall;
   (b) an outer chamber surrounding said inner chamber and having an outer wall, the inner wall of said outer chamber being common with said outer wall of said inner chamber, both inner and outer walls being vertically aligned frusto-conical members set at opposing angles;
   (c) means for retaining particulate filter media means in said outer chamber, said retaining means allowing fluid communication from said fluid through said retaining particulare filter media means into said inner chamber, said means being the inner and outer chamber walls comprised of vertically aligned frusto-conical members set at opposing angles, and wherein both inner and outer chambers have fluid impermeable partitions at the upper and lower ends, and wherein output means are in fluid communication with the inner chamber; and
   (d) means for recovering particulate free fluid from said inner chamber.

2. A method as described in claim 1 wherein fluid is forced through the filter by a pump on the clean water side of the filter, and wherein the pump is submerged in the fluid at a depth sufficient to provide a pressure head to the filter.

3. An apparatus for removing particulate solids from fluids when said apparatus is submerged in said fluid, comprising
   (a) an inner chamber having an outer wall;
   (b) an outer chamber surrounding said inner chamber and having an outer wall, the inner wall of said outer chamber being common with said outer wall of said inner chamber, both inner and outer walls being vertically aligned frusto-conical members set at opposing angles;
   (c) means for retaining particulate filter media means in said outer chamber, said retaining means allowing fluid communication from said fluid through said retained particulate filter media means into said inner chamber, said means being the inner and outer chamber walls comprised of vertically aligned frusto-conical members set at opposing angles, and wherein both inner and outer chambers have fluid impermeable partitions at the upper and lower ends, and wherein output means are in fluid communication with the inner chamber;
   (d) a cylindrical portion in axial alignment with said fluid impermeable end portions of the inner and outer chambers, said cylindrical portion penetrating the lower end of said inner chamber fluid impermeable housing, and the upper fluid impermeable ends of both the inner and outer chambers, said cylindrical portion surrounded by a housing affixed to the upper fluid impermeable end of said outer chamber, said housing containing a baffle situated over the upper end of the cylindrical portion, the interior of the housing in fluid communication with the outer chamber at the lower end and open to a three-way switching valve at the upper end;
   (e) means for recovering particulate free fluid from said inner chamber.

4. An apparatus for removing particulate solids from fluids when said apparatus is submerged in said fluid, comprising,
   (a) an inner chamber having an outer wall;
   (b) an outer chamber surrounding said inner chamber and having an outer wall, the inner wall of said outer chamber being common with said outer wall of said inner chamber, both inner and outer walls being vertically aligned frusto-conical members set as opposing angles;
   (c) means for retaining particulate filter media means in said outer chamber, said retaining means allowing fluid communication from said fluid through said retained particulate filter media means into said inner chamber, said means being the inner and outer chamber walls comprised of vertically aligned frusto-conical members set at opposing angles, and wherein both inner and outer chambers have fluid impermeable partitions at the upper and lower ends, and wherein output means are in fluid communication with the inner chamber;
   (d) a cylindrical portion in axial alignment with said fluid impermeable end portions of the inner and outer chambers, said cylindrical portion penetrating the lower end of said inner chamber fluid impermeable housing, and the upper fluid impermeable ends of both the inner and outer chambers, said cylindrical portion surrounded by a housing affixed to the upper fluid impermeable end of said outer chamber, said housing containing a baffle situated over the upper end of the cylindrical portion, the interior of the housing in fluid communication with the outer chamber at the lower end and open to a three-way switching valve at the upper end, said valve containing a first means capable of directing filtered fluid to a desired source and a second means capable of directing fluid containing particulates cleaned from filter media to a desired source, and
   (e) means for recovering particulate free fluid from said inner chamber.

5. A method for filtering injection water prior to use in an offshore oil platform comprising filtering said water through an apparatus submerged in an ocean environment, said apparatus comprising
   (a) an inner chamber having an outer wall;
   (b) an outer chamber surrounding said inner chamber and having an outer wall, the inner wall of said outer chamber being common with said outer wall of said inner chamber, both inner and outer walls being vertically aligned frusto-conical members set at opposing angles;

(c) means for retaining particulate filter media means in said outer chamber, said retaining means allowing fluid communication from said fluid through said retained particulate filter media means into said inner chamber, said means being the inner and outer chamber walls comprised of vertically aligned frusto-conical members set at opposing angles, and wherein both inner and outer chambers have fluid impermeable partitions at the upper and lower ends, and wherein output means are in fluid communication with the inner chamber;

(d) a cylindrical portion in axial alignment with said fluid impermeable end portions of the inner and outer chambers, said cylindrical portion penetrating the lower end of said inner chamber fluid impermeable housing, and the upper fluid impermeable ends of both the inner and outer chambers, said cylindrical portion surrounded by a housing affixed to the upper fluid impermeable end of said outer chamber, said housing containing a baffle situated over the upper end of the cylindrical portion;

(e) means for recovering particulate free fluid from said inner chamber; wherein (f) fluid is forced through the filter by a pump on the clean water side of the filter, and wherein the pump is submerged in the fluid at a depth sufficient to provide a pressure head to the filter.

* * * * *